Sept. 27, 1955 B. MARIANI 2,718,704
NAVIGATION INSTRUMENT
Filed June 24, 1954 2 Sheets-Sheet 1

INVENTOR.
BRANKO MARIANI.
BY
*Edwin D. Jones,*
ATTORNEY.

Sept. 27, 1955     B. MARIANI     2,718,704
NAVIGATION INSTRUMENT
Filed June 24, 1954     2 Sheets-Sheet 2

INVENTOR.
BRANKO MARIANI.
BY
ATTORNEY.

2,718,704

NAVIGATION INSTRUMENT

Branko Mariani, San Pedro, Calif.

Application June 24, 1954, Serial No. 438,979

13 Claims. (Cl. 33—69)

This invention has for its primary object the provision of a navigation instrument by means of which persons skilled in this art, as well as persons having a limited knowledge of navigation, quickly and accurately may ascertain the position of a sea-going vessel or an aircraft, in terms of correct longitude and latitude.

Another object hereof is to provide an instrument such as described which embodies a sextant and a novel sextant-supporting fixture adapted to be positioned on a compass whereby the sextant may be manipulated in a manner such that the angle of a celestial body observed by the sextant with respect to the observer's meridian or the observer's parallel, as determined by the instrument, may be quickly ascertained with a minimum of computation.

An additional object of this invention is to provide an instrument of this character which may be operated accurately in the manner described without consideration of a dead reckoning position.

Further, it is an object of the present invention which is in the form of a simply constructed unit comprising a standard sextant and an especially designed but simply constructed fixture for mounting the sextant on a compass.

The sextant is but slightly modified to adapt it to the uses of this invention, as the only changes required are that the horizon glass constitute a whole mirror instead of half of the glass next to the frame being a mirror and the other half clear glass. This whole mirrored horizon glass is provided with a central index line, preferably black so that it can be easily distinguished from the image of the celestial body shown in the horizon mirror. The central black index line is quite fine so that it will pass through the center of the horizon glass and will be perpendicular to the frame of the sextant. Moreover, the telescope of the sextant is of angular formation as here shown, for the observer's comfort and convenience.

The especially designed fixture comprises a semicircular flat-sided bar supported upon an annular base which latter is adapted to rest upon the rim of a compass subject to turning so that the plane of the bar may occupy a position facing "north" and "south," or occupy a position facing "east" and "west" on the compass. This semicircular bar when the plane thereof extends at right angles to north and south represents the observer's parallel. When the plane of the semicircular bar extends at right angles to east and west, the bar represents the observer's meridian.

Between the ends of the semicircular bar and above the base, the fixture provides means for mounting the sextant to turn about a horizontal axis which, although the pivot is laterally offset from the plane of the bar, is disposed in line with the center of a circle of which the bar constitutes the top half. This mounting makes it possible to turn the sextant at least 80° in either direction, with the plane of the sextant perpendicular to the plane of the bar in all positions of such adjustment. Moreover, this mounting maintains the center of the index mirror of the sextant in the plane of the bar and at the exact center of a circle of which the bar constitutes the upper half.

I will describe only one form of navigation instrument embodying my invention and will then point out the novel features thereof in claims.

Figure 1:
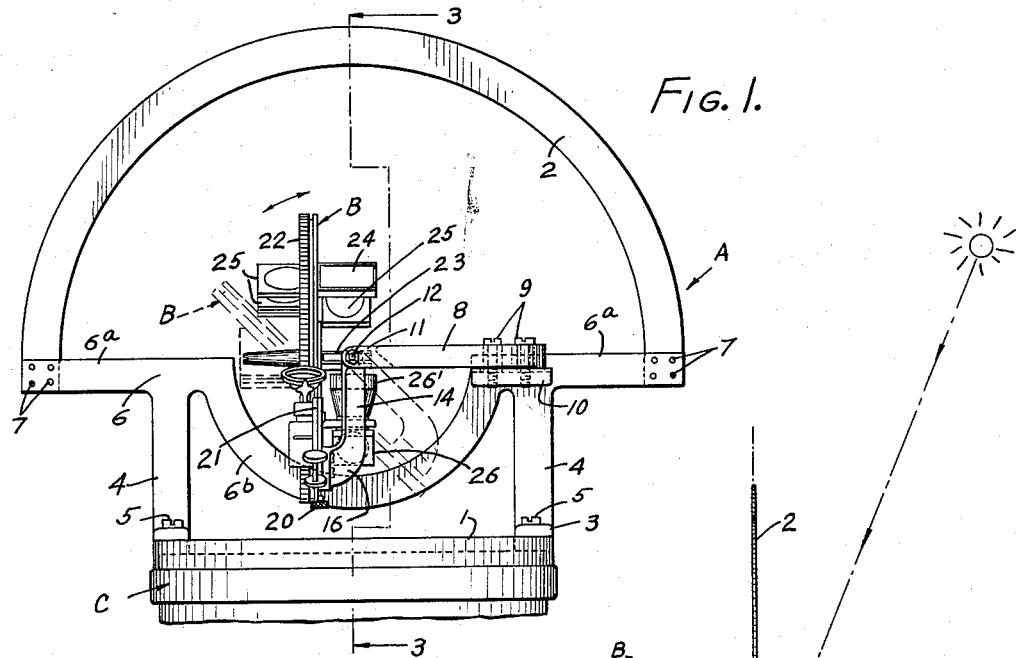
Fig. 1 is a side elevational view of an instrument embodying the present invention, as when mounted upon a compass, the upper part of which latter is also shown in side elevation.

The present embodiment of the invention generally includes a fixture A for supporting a sextant B on a compass C whereby the sextant may be operated in conjunction with the fixture and compass to take readings of celestial bodies.

The fixture A as here shown, includes an annular base 1, a semicircular flat-sided and thin bar 2, and mounting means 3 by which the semicircular bar and the sextant B are supported above the base 1, with the plane of the bar perpendicular to the plane of the base.

The mounting means 3 includes a pair of opposed legs 4 secured by screws 5 to the annular base 1 and supporting at their upper ends a cross bar 6. The cross bar includes horizontal end portions 6a projecting laterally outwardly from the upper ends of the legs 4. Between the legs 4, the bar 6 is formed with a downwardly directed semicircular portion 6b to accommodate movement of the sextant B.

The outer ends of the horizontal portions 6a of bar 6 are secured by fastenings 7 to the ends of the semicircular bar 2 so that the plane of bar 2 is centered with respect to the base 1 and compass C whereby the bar 2 may be aligned with cardinal points on the compass.

Figure 5:
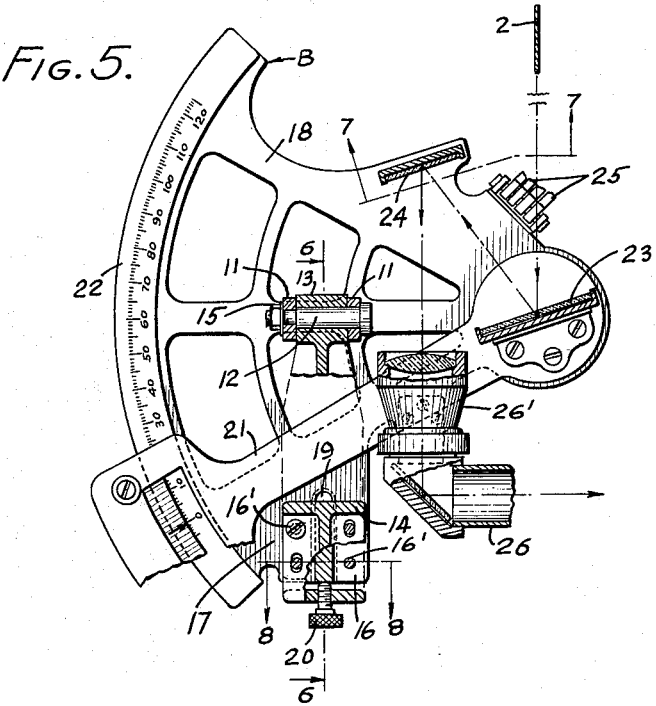
Fig. 5 is a fragmentary sectional view, on an enlarged scale, taken substantially on the line 5—5 of Fig. 2.
Figure 8:
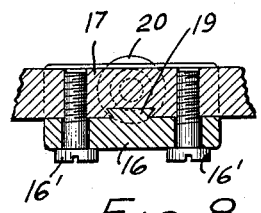
Fig. 8 is a cross-sectional view on an enlarged scale taken on the line 8—8 of Fig. 5.

As a means for mounting the sextant B on the mounting means 3, a horizontally disposed L-shaped bracket 8 is secured at the free end of the shorter leg thereof by fastenings 9 to a laterally extended lug 10 on one of the horizontal portions 6a of the cross bar 6. The outer end of this bracket is laterally offset from the plane of the semicircular bar 2 but in line with the center of a circle, the upper half of which is defined by the bar 2. This outer end is bifurcated to provide opposed horizontally apertured ears 11 for reception of a pivot pin 12 which is extended through a bearing 13 on one end of an arm 14 and held in place by nuts 15. The other end of the arm 14 has an angularly disposed end portion 16 fixed by means of fastenings 16' to a web 17 on the body 18 of the sextant B. The end 16, as shown in Fig. 8, has a dovetailed connection 19 with the web 17 on the sextant. It is additionally secured to the web by means of the thumb screw 20 carried on the end 16 for engaging the web as shown in Fig. 5.

With this arrangement, the mounting arm 14 is clear of the pivoted index arm 21 of the sextant, and the sextant may be swung approximately 80° in either direction about the horizontal axis provided by the pivot pin 12.

The sextant B includes the usual indexed limb 22, an index mirror 23, a horizon mirror 24, light filter unit 25, and a telescope 26. The horizon mirror 24 is provided with a central black line 24'.

The index mirror 23 is located with its center in the plane of the semicircular bar 2 in the exact center of a circle of which the bar 2 represents the upper half.

Figure 3:
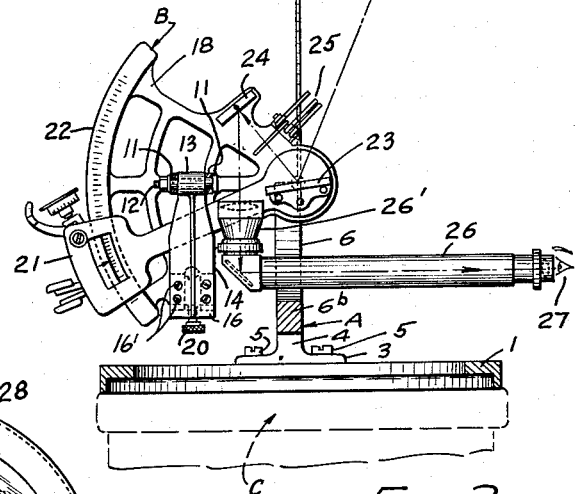
Fig. 3 is a sectional view taken substantially on the line 3—3 of Fig. 1, with the index arm of the compass in a different position than shown in Fig. 5, and illustrating by an exaggerated showing how a celestial body may be observed.

The telescope 26 has its inner end 26' constructed and arranged whereby the image of the celestial body, as reflected by the index mirror 23, will be visible in the horizon mirror 24 to the observer whose eye position is indicated at 27 in Fig. 3. The showing of the rays and the celestial body in Fig. 3 is greatly exaggerated and the incident ray is somewhat incorrect. The purpose of such a showing is to indicate in general without regard to optical exactitude how the angle between the celestial body and the bar 2 is visualized through the observer's line of sight. The position of the sextant mirrors and their works is obviously governed by the law of optics as in any other sextant.

As a means facilitating the positioning of the instrument on the compass so that the semicircular bar 2 is disposed in proper alignment with "east" and "west" or "north" and "south" as the case may be, the annular base 1 is provided with diametrically opposite index marks 28 and 29 which are in a vertical plane normal to the plane of the bar 2. Thus by placing the index marks 28 and 29 on the north and south designation of the compass, the plane of the bar 2 is normal to the north and south plane and extends in line with "east" and "west." Conversely, the placement of the instrument with index marks 28 and 29 aligned with "east" and "west" disposes the bar 2 in line with the "north" and "south" compass designations.

In the operation of the instrument for determining longitude, the instrument is mounted on the compass so that the index marks 28 and 29 are in line with the east and west designations of the compass. In this position of the instrument the bar 2 represents the observer's meridian.

The sextant is now rotated bodily about the axis 12 in the appropriate direction (either toward north or south) while moving the index arm 21 so that index mirror 23 will reflect the image of the celestial body under observation, to the horizon mirror 24. These adjustments are continued until the image is cut in half by the central index line in the horizon mirror. At this instant a chronometer reading is taken and the angle reading of the sextant is noted on the quadrant 22.

The reading of the sextant corrected for refraction constitutes the Local Hour Angle. The chronometer reading constitutes Greenwich Civil Time. With Greenwich Civil Time under consideration, in referring to a Nautical or Air Almanac, the Greenwich Hour Angle is ascertained. Upon now adding the Local Hour Angle to the Greenwich Hour Angle or subtracting the Local Hour Angle from the Greenwich Hour Angle according to the "east" or "west" position of the celestial body, the longitude of the observer's position is determined.

In determining the longitude in this manner, the celestial body must be at least 15° above the horizon.

In bringing the image of the celestial body into visibility as above noted to ascertain longitude the semicircular bar 2 constitutes the observer's meridian visible in the horizon mirror 24 as a central black line.

To determine the proper setting of the instrument on the compass, the index arm 21 is moved to "zero" on the sextant limb 22. If the instrument is properly positioned, the reflection of the semicircular bar 2 should be aligned with the black line in the horizon mirror, and in the observer's line of sight, there is seen just one line and part of the sky. If the index arm is moved a fraction from zero on the sextant limb 22, the central index line will be in the same place but the image of the bar will be moved a little and as a result, two lines will be seen in the horizon mirror, the central line, the bar 2 and part of the sky.

For example, if the observer continues to move the index arm and in his line of sight there appears a celestial body, the arm is adjusted so that the central line cuts the image of the celestial body in half. The observer will then see in the horizon mirror, the celestial body, a part of the sky and the central index line going through the image of the celestial body.

It must be kept in mind that the central index line represents the bar at all times inasmuch as when the sextant is properly mounted and the index arm is on "zero," the central index line and bar 2 must be aligned.

Figure 2:
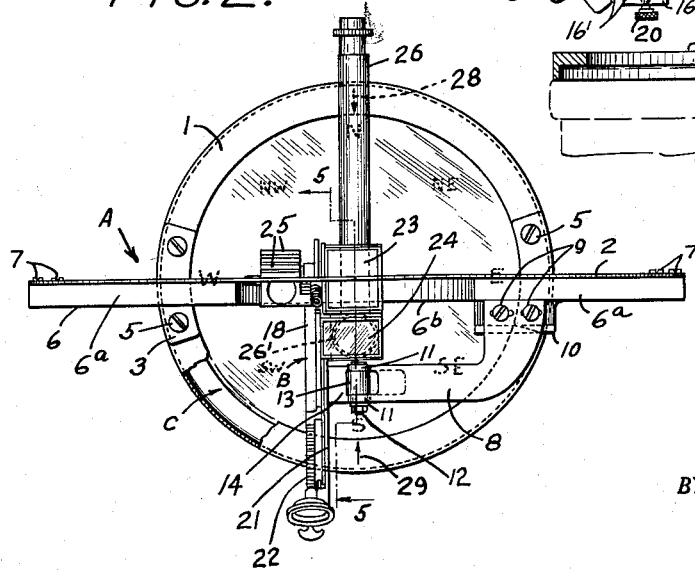
Fig. 2 is a top plan view of the instrument and compass shown in Fig. 1.
Figure 4:
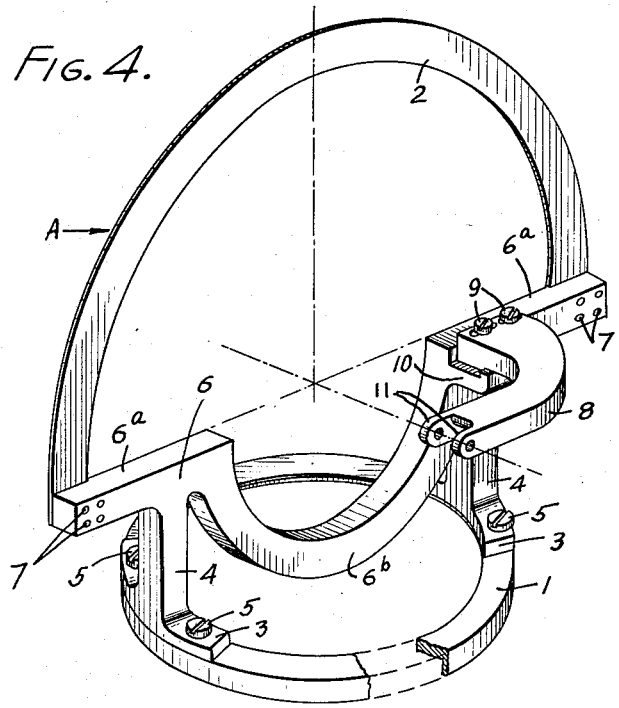
Fig. 4 is a perspective view of the mounting fixture including the semicircular bar, part of the annular base being broken away for clarity of illustration.
Figure 6:
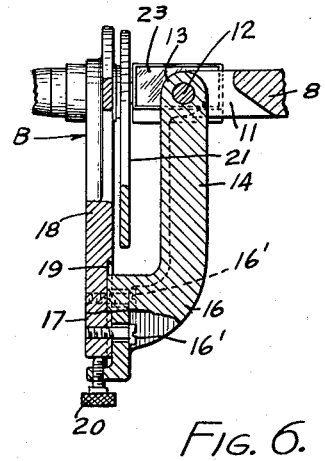
Fig. 6 is a fragmentary sectional view taken substantially on the line 6—6 of Fig. 5.
Figure 7:
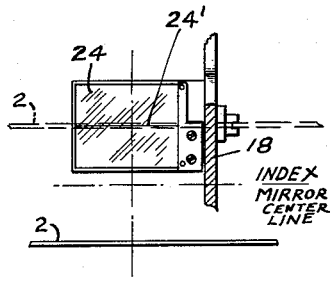
Fig. 7 is a fragmentary sectional view on an enlarged scale taken on the line 7—7 of Fig. 5, to show the arrangement of the horizon mirror.

When it is desired to determine latitude, the instrument is positioned on the compass so that the index marks 28 and 29 on the annular base 1 are in line with "north" and "south" as shown in Fig. 2, whereby the plane of the bar 2 is at right angles to "north" and "south." The same operational procedure is now followed as in finding longitude, except that the declination of the celestial body obtained from the appropriate almanac is added to or subtracted from the angle reading of the sextant.

In this operation to obtain latitude, the image of the celestial body is brought into the observer's line of sight in the same manner as followed in determining longitude, the bar 2 constituting the observer's parallel visible in the horizon mirror 24 as a central index line.

It should be noted that the preferable position of the celestial body should be 10° (degrees) on either side of the meridian, and if correction tables are used in solving any problems after the readings are determined by the instrument of this invention, such functions are outside of the scope of the present invention.

If desired, the annular base 1 may be weighted with a lead filling (not shown) to stabilize the instrument so that tilting or unintentional movement thereof on the compass is prevented.

Although I have herein shown and described only one form of navigation instrument embodying my invention, it is to be understood that various changes and modifications may be made therein without departing from the spirit of the invention and the spirit and scope of the appended claims.

What I claim is:

1. A navigation instrument including: a fixture providing an arcuate base constructed to seat upon a compass and to be turned about its axis and characterized by an arcuate bar supported on said base in a plane normal to the plane of said base in a position such that upon said turning of said base, said bar may be disposed to occupy positions of alignment with opposite cardinal points of the compass; a sextant; and means mounting said sextant on said base beneath said bar for bodily movement in either direction about an axis normal to the plane of said bar and intersecting the center of a circle of which said bar constitutes an upper segment, the mounting of said sextant being such that the index mirror of the sextant has its center at all times in the plane of said bar and in the center of said circle.

2. A navigation instrument including: an annular base constructed to seat upon a compass for turning in either direction and characterized by a semi-circular bar supported on the base so as to extend thereabove in a plane perpendicular to the plane of the base and across the center of the compass; the turning of the base about its axis disposing said bar in positions for alignment with cardinals points on the compass; a sextant; and means on the base mounting the sextant beneath said bar for turning movement in either direction about an axis normal to the plane of said bar and intersecting the center of a circle the upper half of which is represented by said bar; the plane of said sextant being normal to that of said bar in all adjusted positions of the sextant about said axis; the index mirror of the sextant being centered in the plane of said bar beneath said bar in the center of said circle.

3. A navigation instrument including: an annular base constructed to seat upon a compass for turning in either direction and characterized by a semicircular bar supported on the base so as to extend thereabove in a plane normal to the plane of the base and across the center of the compass; the turning of the base about its axis disposing said bar in positions of alignment with cardinal points on the compass; a sextant; and means connected with the base mounting the sextant beneath said bar for turning movement in either direction about an axis normal to the plane of said bar and intersecting the center of a circle the upper half of which is represented by said bar whereby the plane of said sextant will be perpendicular to that of said bar in all adjusted positions of the sextant about said axis; the index mirror of the sextant being centered in the plane of said bar beneath said bar in the center of said circle; the pivot about which said sextant is movable being offset from the plane of the sextant as well as laterally offset from the plane of said bar whereby the index arm of the sextant is freely movable.

4. A navigation instrument including: an annular base constructed to seat upon a compass for turning in either direction and characterized by a semicircular bar supported on the base so as to extend thereabove in a plane normal to the plane of the base and across the center of the compass; the turning of the base about its axis disposing said bar in positions for alignment with cardinal points on the compass; a sextant; means on the base mounting the sextant beneath said bar for turning movement in either direction about an axis normal to the plane of said bar and intersecting the center of a circle the upper half of which is represented by said bar; the plane of said sextant being normal to that of said bar in all adjusted positions of the sextant about said axis; the index mirror of the sextant being centered in the plane of said bar beneath said bar in the center of said circle, said mounting means including upstanding legs diametrically opposite one another on said base; a cross bar supported between said legs; said semi-circular bar having its ends fixed to said cross bar; said cross bar having a depending arcuate portion intermediate said legs to accommodate said movement of said sextant; and members on said sextant and said cross bar respectively pivotally connected to provide the axis for said turning movement of said sextant.

5. A navigation instrument including: a fixture providing an arcuate base constructed to seat upon a compass and to be turned about its axis and characterized by an arcuate bar supported on said base in a plane normal to the plane of said base in a position such that upon said turning of said base, said bar may be disposed to occupy positions of alignment with opposite cardinal points of the compass; a sextant; and means mounting said sextant on said base beneath said bar for bodily movement in either direction about an axis normal to the plane of said bar and intersecting the center of a circle of which said bar constitutes an upper segment, the mounting of said sextant being such that the index mirror of the sextant has its center at all times in the plane of said bar and in the center of said circle, said sextant having a horizon mirror on the limb of the sextant; said horizon mirror having a line marked across the center thereof whereby the image of said bar may be aligned therewith.

6. A navigation instrument including: an annular base constructed to seat upon a compass for turning in either direction and characterized by a semicircular bar supported on the base so as to extend thereabove in a plane perpendicular to the plane of the base and across the center of the compass; the turning of the base about its axis disposing said bar in positions for alignment with cardinal points on the compass; a sextant; and means on the base mounting the sextant beneath said bar for turning movement in either direction about an axis normal to the plane of said bar and intersecting the center of a circle the upper half of which is represented by said bar; the plane of said sextant being normal to that of said bar in all adjusted positions of the sextant about said axis; the index mirror of the sextant being centered in the plane of said bar beneath said bar in the center of said circle, there being a horizon mirror on the limb of the sextant; said horizon mirror having a center marking thereon with which the image of the bar, as reflected by the index mirror may be aligned.

7. A navigation instrument including: an annular base constructed to seat upon a compass for turning in either direction and characterized by a semicircular bar supported on the base so as to extend thereabove in a plane perpendicular to the plane of the base and across the center of the compass; the turning of the base about its axis disposing said bar in positions for alignment with cardinal points on the compass; a sextant; and means on the base mounting the sextant beneath said bar for turning movement in either direction about an axis normal to the plane of said bar and intersecting the center of a circle the upper half of which is represented by said bar; the plane of said sextant being normal to that of said bar in all adjusted positions of the sextant about said axis; the index mirror of the sextant being centered in the plane of said bar beneath said bar in the center of said circle, said base having index marks 180° apart on the upper surface thereof adapted to be aligned with opposite points of the compass.

8. A navigation instrument including: an annular base constructed to seat upon a compass for turning in either direction and characterized by a semicircular bar supported on the base so as to extend thereabove in a plane normal to the plane of the base and across the center of the compass; the turning of the base about its axis disposing said bar in positions for alignment with cardinal points on the compass; a sextant; means on the base mounting the sextant beneath said bar for turning movement in either direction about an axis normal to the plane of said bar and intersecting the center of a circle the upper half of which is represented by said bar; the plane of said sextant being normal to that of said bar in all adjusted positions of the sextant about said axis; the index mirror of the sextant being centered in the plane of said bar beneath said bar in the center of said circle, said mounting means including a cross bar to which the ends of said semicircular bar are fixed; means supporting said cross bar above said base; an arm fixed to said sextant; a bracket fixed to said cross bar, and a pivotal connection between said arm and said bracket.

9. A navigation instrument including: an annular base constructed to seat upon a compass for turning in either direction and characterized by a semicircular bar supported on the base so as to extend thereabove in a plane normal to the plane of the base and across the center of the compass; the turning of the base about its axis disposing said bar in positions for alignment with cardinal points on the compass; a sextant; means on the base mounting the sextant beneath said bar for turning movement in either direction about an axis normal to the plane of said bar and intersecting the center of a circle the upper half of which is represented by said bar; the plane of said sextant being normal to that of said bar in all adjusted positions of the sextant about said axis; the index mirror of the sextant being centered in the plane of said bar beneath said bar in the center of said circle, said mounting means including legs extending upwardly from opposite points on said base, a cross bar mounted on said legs; said semicircular bar being mounted on said cross bar; a bracket on said cross bar; an arm on said bracket; means pivotally connecting said arm to said bracket, said bar having a portion thereof spaced below the sextant whereby the sextant may be moved about said axis in either direction.

10. A navigation instrument including: a fixture having a base constructed to seat upon a compass for angular movement about the axis of the compass; said fixture including an arcuate bar disposed so that it may be aligned with opposite cardinal points of the compass; and means for mounting a sextant on said fixture beneath said bar for bodily movement in either direction about an axis normal to the plane of said bar and intersecting the center of a circle of which the bar constitutes a segment; the mounting means for the sextant disposing the index mirror of the sextant in the plane of said bar and in the center of said circle.

11. A navigation instrument including: a fixture having a base constructed to seat upon a compass for angular movement about the axis of the compass; said fixture including an arcuate bar disposed so that it may be aligned with opposite cardinal points of the compass; and means for mounting a sextant on said fixture beneath said bar for bodily movement in either direction about an axis normal to the plane of said bar and intersecting the center of a circle of which the bar constitutes a segment; said mounting means providing for the turning of the sextant at least 80° in either direction with the plane of the sextant perpendicular to the plane of the bar in positions of such adjustment and with the index mirror of the sextant disposed in the center of said circle.

12. A navigation instrument including: a base constructed to seat upon a compass for angular movement about the axis of the compass; an arcuate bar supported by said base in a position such that the bar may be aligned with opposite cardinal points of the compass; a sextant; and means connected with said base mounting the sextant beneath said bar for angular movement about an axis normal to the plane of said bar and intersecting the center of a circle of which latter said bar constitutes a segment, the index mirror of the sextant being disposed in the plane of said bar and in the center of said circle; said sextant having a horizon mirror on which appears a line whereby the image of the bar may be brought into alignment with said line.

13. A navigation instrument including: a base constructed to seat upon a compass for angular movement about the axis of the compass; an arcuate bar supported by said base in a position such that the bar may be aligned with opposite cardinal points of the compass and a sextant mounted on said base beneath said bar for turning movement in either direction about an axis normal to the plane of said bar; said axis intersecting the center of a circle of which the bar constitutes a segment; the plane of the sextant being normal to the plane of said bar in all adjusted positions of the sextant about said axis, the index mirror of the sextant being centered in the plane of said bar; there being a horizon mirror on the limb of the sextant; said horizon mirror having a marking thereon with which the image of the bar may be aligned.

References Cited in the file of this patent

UNITED STATES PATENTS

| 16,002 | Burt | Nov. 4, 1856 |
| 2,189,790 | Gardner et al. | Feb. 13, 1940 |
| 2,389,852 | Hagner | Nov. 27, 1945 |

FOREIGN PATENTS

| 2,081 | Great Britain | Jan. 19, 1796 |